US012591481B1

(12) United States Patent
Petrillo et al.

(10) Patent No.: US 12,591,481 B1
(45) Date of Patent: Mar. 31, 2026

(54) SYSTEM AND METHOD FOR ANOMALY PREDICTION, DETECTION AND PREVENTION

(71) Applicant: Morgan Stanley Services Group Inc., New York, NY (US)

(72) Inventors: Vincent Petrillo, New York, NY (US); Afreen Bano Ansari, Mumbai (IN); Soham Sen, Mumbai (IN); Tarik M. Sheth, Mumbai (IN); Harsh Sharma, Montreal (CA)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/270,008

(22) Filed: Jul. 15, 2025

(51) Int. Cl.
*G06F 11/07* (2006.01)
*G06F 11/30* (2006.01)
*G06F 11/34* (2006.01)

(52) U.S. Cl.
CPC ...... *G06F 11/0793* (2013.01); *G06F 11/0715* (2013.01); *G06F 11/302* (2013.01); *G06F 11/3447* (2013.01); *G06F 11/3466* (2013.01)

(58) Field of Classification Search
CPC .............. G06F 11/0715; G06F 11/079; G06F 11/0793; G06F 11/302; G06F 11/3447; G06F 11/3452; G06F 11/3466; G06N 20/20; H04L 41/0631; H04L 41/064
See application file for complete search history.

(56) References Cited

U.S. PATENT DOCUMENTS

| | | | | |
|---|---|---|---|---|
| 9,672,085 | B2 * | 6/2017 | Zhu ..................... | G06Q 10/0639 |
| 10,985,970 | B1 | 4/2021 | Goyal et al. | |
| 11,373,131 | B1 | 6/2022 | Venugopal et al. | |
| 11,783,210 | B2 | 10/2023 | Koyyalummal et al. | |
| 2009/0216910 | A1 | 8/2009 | Duchesneau | |
| 2010/0005339 | A1 | 1/2010 | Hooks | |
| 2010/0083055 | A1 * | 4/2010 | Ozonat ............... | G06F 11/3447 |
| | | | | 714/E11.179 |
| 2010/0083145 | A1 | 4/2010 | Schang et al. | |
| 2011/0161274 | A1 * | 6/2011 | Gao ....................... | G06Q 10/10 |
| | | | | 706/50 |
| 2011/0185234 | A1 * | 7/2011 | Cohen ................. | G06F 11/3476 |
| | | | | 714/E11.029 |
| 2013/0104236 | A1 | 4/2013 | Ray et al. | |

(Continued)

*Primary Examiner* — Gabriel Chu
(74) *Attorney, Agent, or Firm* — PEARL COHEN ZEDEK LATZER BARATZ LLP

(57) ABSTRACT

A system and method for anomaly prediction in a plurality of applications to maintain operability of the system. Real-time data from the plurality of applications can be received, and for each desired variable in the data an entropy that can indicate an anomaly in the respective data. The data can be divided into batches of fixes size and a plurality of machine learning (ML) models applied to each of the batches to determine whether the data contains an anomaly or is about to contain an anomaly. The plurality of ML models can be trained based on historical data from the plurality of applications. A large language model (LLM) can be applied to the output of the plurality of ML models to evaluate performance/fine tune the plurality of ML models, and an alert can be transmitted to a system that automatically executes script(s) to take action to avoid the anomaly.

20 Claims, 4 Drawing Sheets

(56)

References Cited

U.S. PATENT DOCUMENTS

| | | | | |
|---|---|---|---|---|
| 2013/0198556 A1* | 8/2013 | Kolbet | G06Q 10/20 | |
| | | | 714/2 | |
| 2014/0325254 A1* | 10/2014 | Mani | G06F 16/285 | |
| | | | 707/738 | |
| 2014/0325364 A1* | 10/2014 | Tee | G06F 11/0751 | |
| | | | 715/736 | |
| 2015/0032752 A1* | 1/2015 | Greifeneder | H04L 41/064 | |
| | | | 707/738 | |
| 2015/0117174 A1* | 4/2015 | Alber | G11B 17/00 | |
| | | | 369/53.41 | |
| 2015/0235139 A1* | 8/2015 | Sharma | G06N 5/043 | |
| | | | 706/58 | |
| 2015/0325108 A1* | 11/2015 | Banerjee | G08B 29/00 | |
| | | | 340/506 | |
| 2017/0257297 A1 | 9/2017 | Mathew et al. | | |
| 2017/0293542 A1* | 10/2017 | Xu | G06N 3/084 | |
| 2018/0089017 A1* | 3/2018 | Cook | G06F 11/0709 | |
| 2018/0349482 A1 | 12/2018 | Oliner et al. | | |
| 2018/0365309 A1 | 12/2018 | Oliner et al. | | |
| 2019/0068622 A1 | 2/2019 | Lin et al. | | |
| 2019/0089725 A1 | 3/2019 | Anachi | | |
| 2019/0280942 A1 | 9/2019 | Cote et al. | | |
| 2020/0050507 A1 | 2/2020 | Fox | | |
| 2020/0067789 A1 | 2/2020 | Khuti et al. | | |
| 2020/0134069 A1* | 4/2020 | Chennen | G06F 11/3055 | |
| 2020/0143481 A1* | 5/2020 | Brown | G06N 20/20 | |
| 2020/0174867 A1* | 6/2020 | Mo | G06F 11/079 | |
| 2020/0252264 A1* | 8/2020 | Arora | H04L 43/0817 | |
| 2021/0027205 A1* | 1/2021 | Sevakula | G06F 11/3447 | |
| 2021/0075700 A1 | 3/2021 | Palladino et al. | | |
| 2021/0264332 A1 | 8/2021 | Pingali et al. | | |
| 2021/0373927 A1 | 12/2021 | Pillay et al. | | |
| 2022/0114044 A1 | 4/2022 | Singh | | |
| 2022/0122001 A1* | 4/2022 | Choe | G06N 20/20 | |
| 2022/0129816 A1 | 4/2022 | Ralhan et al. | | |
| 2023/0039566 A1 | 2/2023 | Ghag et al. | | |
| 2023/0069177 A1 | 3/2023 | Albright et al. | | |
| 2023/0300152 A1* | 9/2023 | Brancato | H04L 63/1425 | |
| | | | 726/23 | |
| 2023/0367668 A1 | 11/2023 | Oglesby et al. | | |
| 2023/0370324 A1 | 11/2023 | Oglesby et al. | | |
| 2024/0070012 A1 | 2/2024 | Baldassarre et al. | | |
| 2024/0220914 A1 | 7/2024 | Bonafe et al. | | |
| 2024/0223360 A1 | 7/2024 | Borrill | | |

* cited by examiner

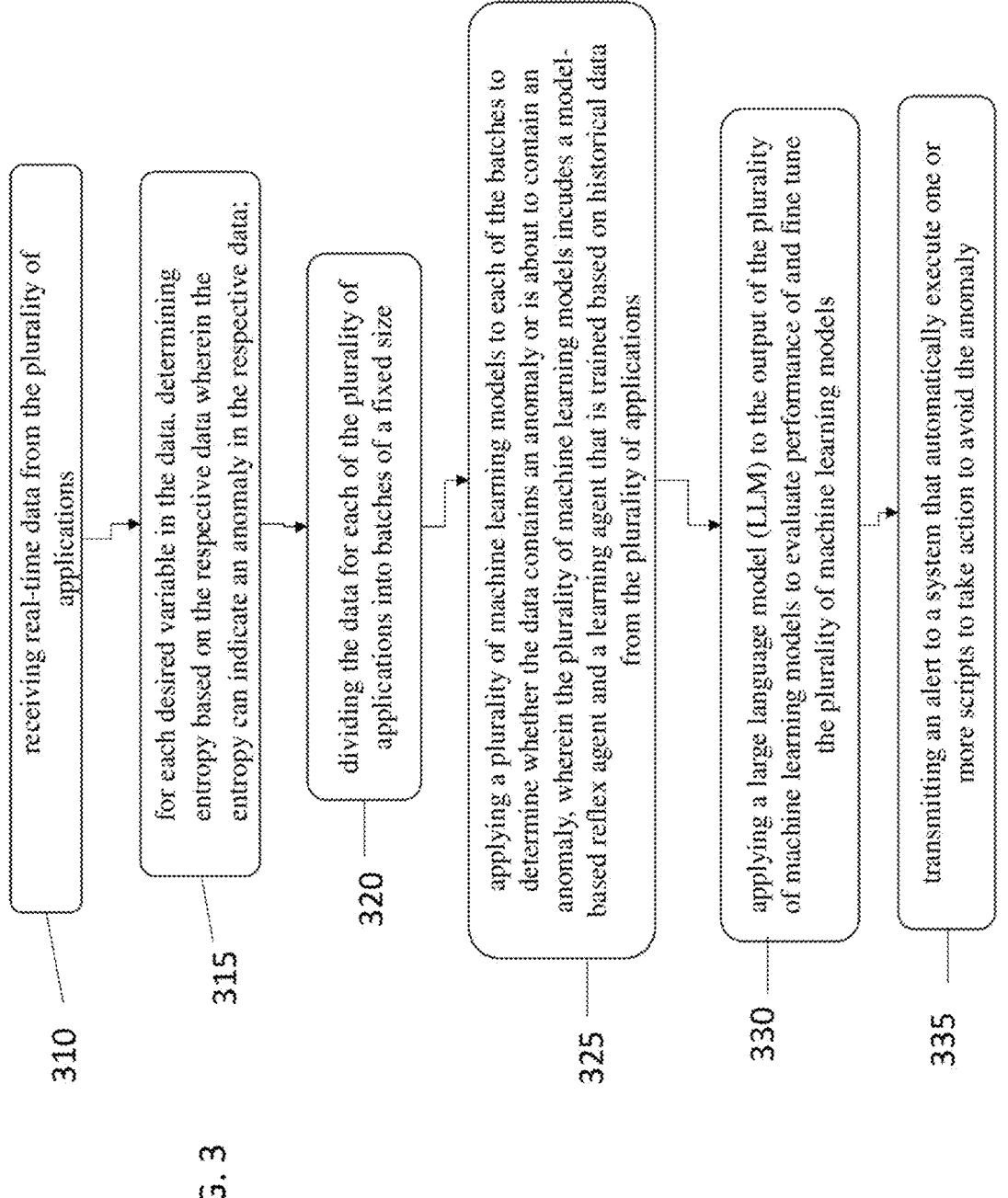

FIG. 3

310 — receiving real-time data from the plurality of applications

315 — for each desired variable in the data, determining entropy based on the respective data wherein the entropy can indicate an anomaly in the respective data;

320 — dividing the data for each of the plurality of applications into batches of a fixed size 325 — applying a plurality of machine learning models to each of the batches to determine whether the data contains an anomaly or is about to contain an anomaly, wherein the plurality of machine learning models incudes a model-based reflex agent and a learning agent that is trained based on historical data from the plurality of applications 330 — applying a large language model (LLM) to the output of the plurality of machine learning models to evaluate performance of and fine tune the plurality of machine learning models 335 — transmitting an alert to a system that automatically execute one or more scripts to take action to avoid the anomaly

SYSTEM AND METHOD FOR ANOMALY PREDICTION, DETECTION AND PREVENTION

TECHNICAL FIELD OF THE INVENTION

The present invention relates generally to handling anomalies in applications and systems. In particular, to predicting when an anomaly is likely to occur, detection anomalies, and/or preventing the anomaly when detected.

BACKGROUND OF THE INVENTION

Currently, systems can run many applications (e.g., 100's) and log data such that when anomalies occur the log data can be viewed manually and examined for fault. For example, for a system that runs out of memory, prior to the memory running out an out of memory exception can be logged. Typically, when an error occurs an alert is generated. For example, an out of memory alert can be generated. The alert can be sent to an administrator who then attempts to fix the issue and may manually inspect the log. During the time the administrator is fixing the issue the entire system can be hung. Additional difficulties with current approach can include inconsistent analysis between administrators, variability in time it can take to resolve issues between administrators, and/or inability to predict the anomaly before it occurs, thus preventing the anomaly all together.

Some current methods for anomaly detection suffer from various difficulties, e.g., they can fail to update along with the system (e.g., threshold based alerts), such that the threshold values become stale and/or irrelevant, they can generate false positives, can have difficulty scaling and/or require experts to continue tuning.

Accordingly, it can be desirable to predict, detect and/or prevent system anomalies with a dynamic approach at or near real-time.

SUMMARY OF THE INVENTION

Advantages of the invention can include early detection of anomalies by, for example, identifying deviations from normal system behavior in real-time which can enable faster response, e.g., before the anomaly escalates into a larger system incident. Advantages of the invention can include pinpointing underlying causes of anomalies, facilitating targeted remediation efforts and minimizing troubleshooting time. Advantages of the invention can include automated remediation by, for example, implementing automated responses to anomalies.

In one aspect, the invention involves a method for anomaly prediction in a plurality of applications of a system to maintain operability of the system. The method can involve receiving real-time data from the plurality of applications. The method can involve for each desired variable in the data, determining entropy based on the respective data wherein the entropy can indicate an anomaly in the respective data. The method can involve dividing the data for each of the plurality of applications into batches of a fixed size. The method can involve applying a plurality of machine learning models to each of the batches to determine whether the data contains an anomaly or is about to contain an anomaly, wherein the plurality of machine learning models includes a model-based reflex agent and a learning agent that is trained based on historical data from the plurality of applications. The method can involve applying a large language model (LLM) to the output of the plurality of machine learning models to evaluate performance of and fine tune the plurality of machine learning models. The method can involve transmitting an alert to a system that automatically execute one or more scripts to take action to avoid the anomaly.

In some embodiments, the data is logs, metrics, network traffic, or any combination thereof. In some embodiments, the LLM is fine tuned based on the entropy. In some embodiments, the method involves determining entropy further comprises determining a frequency distribution for each of the desired variables.

In some embodiments, the plurality of machine learning models are further trained with the real-time data when an anomaly is predicted in the real-time data. In some embodiments, each entropy value can be based on a probability.

In some embodiments, the plurality of machine learning models includes a signal extractor agent, a root mapper agent to correlate rules, a risk profiler agent, or any combination thereof. In some embodiments, the data further comprises time series behavior of the CPU, memory latency reports, historical baseline performance, traffic, error rate or any combination thereof.

In another aspect, the system includes a system for anomaly prediction in a plurality of applications of a system to maintain operability of the system. The system can include a memory and a processor configured to receive real-time data from the plurality of applications. The processor can also be configured to each desired variable in the data, and determine entropy based on the respective data wherein the entropy can indicate an anomaly in the respective data. The processor can also be configured to divide the data for each of the plurality of applications into batches of a fixed size. The processor can also be configured to apply a plurality of machine learning models to each of the batches to determine whether the data contains an anomaly or is about to contain an anomaly, wherein the plurality of machine learning models includes a model-based reflex agent and a learning agent that is trained based on historical data from the plurality of applications. The processor can also be configured to apply a large language model (LLM) to the output of the plurality of machine learning models to evaluate performance of and fine tune the plurality of machine learning models. The processor can also be configured to transmit an alert to a system that automatically executes one or more scripts to take action to avoid the anomaly.

In some embodiments, the data is logs, metrics, network traffic, or any combination thereof. In some embodiments, the LLM is fine tuned based on the entropy. In some embodiments, determining entropy further comprises determining a frequency distribution for each of the desired variables.

In some embodiments, the plurality of machine learning models are further trained with the real-time data when an anomaly is predicted in the real-time data. In some embodiments, each entropy value can be based on a probability.

In some embodiments, the plurality of machine learning models includes a signal extractor agent, a root mapper agent to correlate rules, a risk profiler agent, or any combination thereof.

In some embodiments, the data further comprises time series behavior of the CPU, memory latency reports, historical baseline performance, traffic, error rate or any combination thereof.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is flowchart for a method for anomaly prediction in a plurality of applications of a system to maintain operability of the system, according to some embodiments of the invention.

Figure 1:
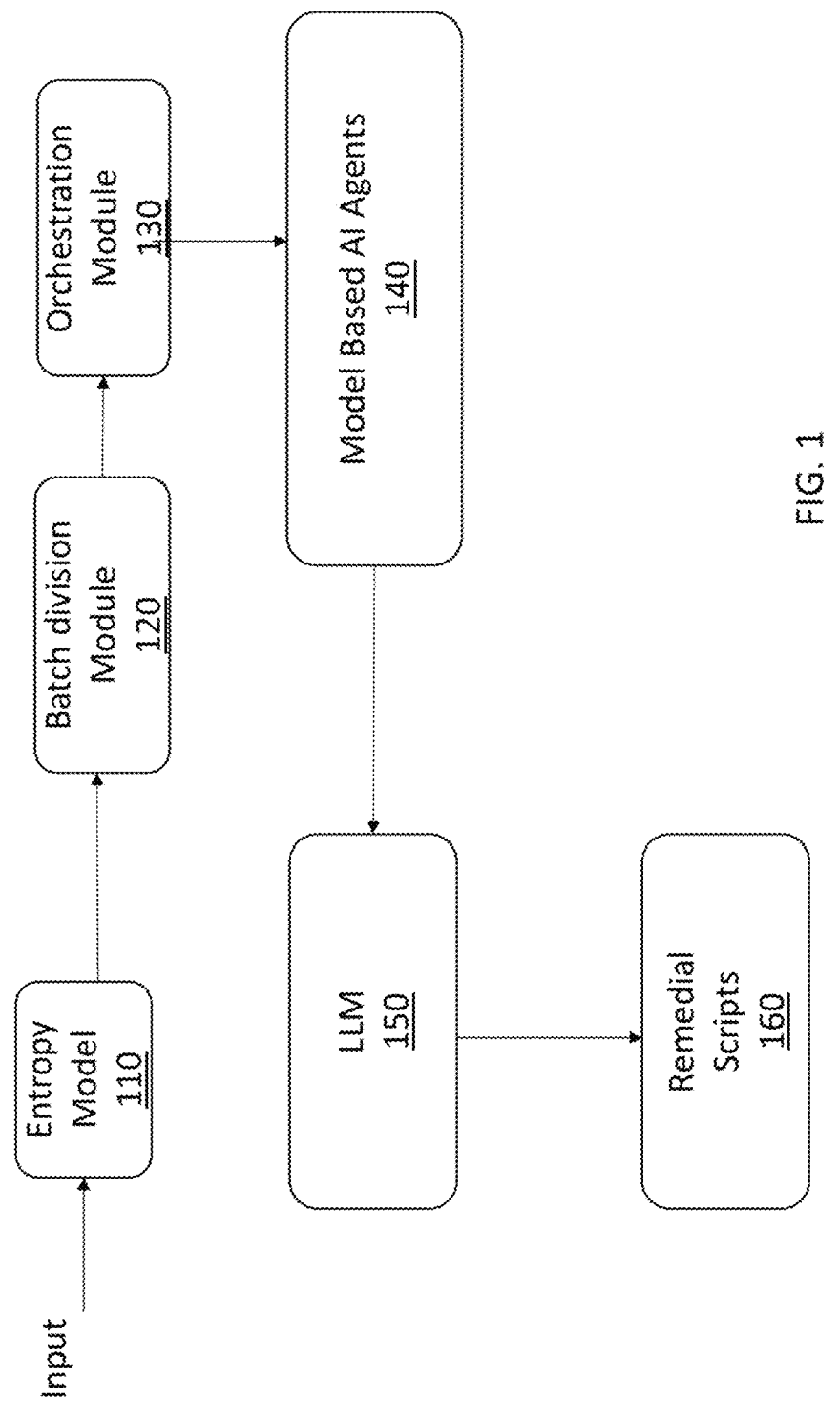
FIG. 1 shows a block diagram of a system architecture for anomaly prediction in a plurality of applications of a system to maintain operability of the system, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

As used herein, "machine learning", "machine learning algorithms", "machine learning models", "ML", or similar, may refer to models built by algorithms in response to/based on input sample or training data. ML models may make predictions or decisions without being explicitly programmed to do so. ML models require training/learning based on the input data, which may take various forms.

ML models may, for example, include Large Language Models (LLM) such as Generative Pre-Trained Transformer (GPT), Bidirectional Encoder Representations from Transformers (BERT), Pathways Language Model (PaLM) and the like, (artificial) neural networks (NN), decision trees, regression analysis, Bayesian networks, Gaussian networks, genetic processes, etc. Additionally or alternatively, ensemble learning methods may be used which may use multiple/modified learning algorithms, for example, to enhance performance. Ensemble methods, may, for example, include "Random forest" methods or "XGBoost" methods.

Neural networks (NN) (or connectionist systems) are computing systems inspired by biological computing systems, but operating using manufactured digital computing technology. NNs are made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning proceeds. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example transformer NNs, useful for speech or natural language applications, and long short-term memory (LSTM) networks.

Typical NNs can require that nodes of one layer depend on the output of a previous layer as their inputs. Current systems typically proceed in a synchronous manner, first typically executing all (or substantially all) of the outputs of a prior layer to feed the outputs as inputs to the next layer. Each layer can be executed on a set of cores synchronously (or substantially synchronously), which can require a large amount of computational power, on the order of 10s or even 100s of Teraflops, or a large set of cores. On modern GPUs this can be done using 4,000-5,000 cores.

It will be understood that any subsequent reference to "machine learning", "machine learning algorithms", "machine learning models", "ML", or similar, may refer to any/all of the above ML examples, as well as any other ML models and methods as may be considered appropriate.

FIG. 1 shows a block diagram of a system architecture for anomaly prediction in a plurality of applications of a system to maintain operability of the system, according to some embodiments of the invention.

The system architecture can include an entropy model 110, a batch division module 120, an orchestration module 130, model based AI agents 140, LLM 150, and remedial scripts 160. The entropy model 110, the batch division module 120, the orchestration module 130, the model based AI agents 140, and the LLM 150 can be an anomaly detection engine. The anomaly detection engine can be implemented on one processor or several processors. The anomaly detection engine can be implemented in any system having a plurality of applications desiring anomaly detection/remediation.

The plurality of applications can be on the order or 20, 30, to 100's or thousands of applications. The anomaly detection engine can detect anomalies on an application by application basis and can run in parallel on all applications. For example, the anomaly detection engine can determine anomalies in 20, 30 to 100's or thousands of applications in parallel.

The entropy model 110 can receive data from the plurality of applications. The data can be received in real-time. The real-time data can be analyzed for an anomaly as described below. If an anomaly is suspected/identified in the real-time data, logged data and/or historical performance data can be input to the entropy model 110 and analyzed by the same methods/modules as the real-time data for comparison against the real-time data results to detect whether the anomaly in the real-time data is one that has already happened in the past. For example, assume an anomaly is suspected in the real-time data The entropy model 110 can receive data from logs (e.g., every 24 hours, seven days, or any desirable interval as input by a user).

The data can include application metrics, application logs, network traffic, network traffic error rate, time series behavior of a CPU running the application, memory usage, latency reports, HTTP server requests, historical baseline performance of the data, or any combination thereof. The real-time data can include Cortex data. Real-time log data can be logged by each respective application. The real-time log data can be received via Loki, or other applications/solutions as are known in the art.

The historical baseline performance of the data can be monitoring data, service-level objectives (SLOs), error budgets, past incidents, based on observability tools, or any combination thereof.

The monitoring data can be metrics, e.g., latency, errors, saturation, and traffic gathered over time. The service-level objectives (SLOs) can be acceptable level of performance for an application and are based on service level indicators (SLIs), which are the metrics used to track performance. The error budgets can be error budget from SLOs that allow for a certain amount of unreliability, which can be used as a baseline for acceptable performance variations. The past incidents can be analyzed and their impact on performance can help identify potential performance bottlenecks and/or set baselines. The performance testing data can involve simulating real-world conditions to measure application performance and/or establish baselines. The observability tool can provide real-time insights into application performance, including metrics, logs, and traces, and can help create a historical baseline.

The entropy model 110 can determine entropy for one or more desired variables in the real-time data and/or the log data. The desired variables can be input by user.

Input data can include data sequences (e.g., network traffic, activity data, or sensor readings) as vectors, and can allow for calculation of entropy values. The entropy values can be used to identify anomalies by comparing them to a baseline or threshold, indicating deviations from normal behaviour.

The entropy can be determined as shown below in EQN. 1:

$$H(X) = -i = 1\Sigma n P(xi) \log bP(xi) \qquad \text{EQN. 1}$$

where H(X) is the entropy of the data, X is the data, P(xi) is a probability of occurrence of each event xi in the data, and b is base of logarithm (e.g., e, 2 or 10). A higher entropy can indicate events are evenly distributed (e.g., high uncertainty) whereas a lower entropy can indicate one event dominating (e.g., low uncertainty).

The desired variables can be from the log data. The log data can be over a specified window (e.g., as input by a user or provided by the applications). The log data can include HTTP status codes, IP addresses, request types or any combination thereof. A frequency distribution of each of the data (e.g., events) can be determined (e.g., how often each HTTP status code appears in the data). The entropy of the frequency distribution for each event can be determined, e.g., as shown above in EQN. 1

The desired variables can be from the metric data. The metric data can be CPU utilization, request latency, error rates, or any combination thereof. Ranges of potential values of the metric data can be divided into discrete buckets based on value (e.g., latency ranges 0-50 ms, 50-100 ms). Probabilities of the metric data falling into each bucket can be determined. In some embodiments, determining the probabilities of the metric data can avoid hallucinating the LLMs, which can occur due to overly large metric data.

The desired variables can be from network traffic data. The network traffic data can include source/destination IP, ports, protocols or any combination thereof. The entropy of the network traffic data can be determined via EQN. 1 as shown above.

The entropy module 110 can output the input data corresponding to data variables that have a high entropy. High entropy can be determined by establishing a baseline (e.g., an expected range for system metrics) and calculating entropy. The entropy can quantify randomness within each metrics data points and thresholds can be determined based on the entropy of the baseline. The thresholds can be high enough to avoid false positives while capturing significant deviations.

The batch division module 120 can receive the output data from the entropy module 110, and divide the data into batches. The batches can be fixed sized in length (e.g., 1000 logs per batch). The batch size can depend on the size of the output data and/or a size of the memory processing the data.

The orchestration module 130 receives the batches and transmits the batches to a corresponding agent of the model based AI agent module 140. The orchestration module 130 can analyze the batches and determine which data fields are present. Each of the agents of the model based AI agent modules 140 can take as input different data field sets, such that data fields in the batches can indicate which agent of the models based AI agent module 140 to use. For example, assume a first agent has a data field set of input A, input B, and input C, and a second agent has a data field set of input A, input D and input E. If the batch has input A, input B and input C, the orchestration modules knows to send the batch data to the first agent.

The orchestration module 130 can operate via a staged execution pipeline that can include metadata extraction, policy-driven agent selection, concurrent scheduling, intermediate result evaluation, and/or dynamic re-routing. The orchestration module 130 can include rule-based logic and/or asynchronous execution frameworks to manage workflows of the model based AI agents 140, applying context-aware decision-making at each stage. Its modular architecture can support extensibility, conditional bypassing, and/or feedback-aware configuration updates, thereby enabling efficient and intelligent coordination of complex AI agent systems.

The staged execution pipeline of the orchestration module 130 can include batch intake and metadata extraction, policy evaluation, dynamic scheduling and execution, intermediate evaluation and re-routing and/or action triggering and feedback loop.

The batch intake and metadata extraction can involve upon receiving a data batch from the batch division module 120, the orchestration module 130 can extracting metadata such as Batch ID and timestamp, entropy score (e.g., from entropy model 110), source application or system data, preliminary anomaly indicators, and/or resource usage status from system monitors. This metadata can be stored in a data structure (e.g., a Python dictionary or database row) that can allow downstream decision processing.

The policy evaluation can include a policy evaluation engine. The orchestration module 130 can executed the extracte metadata against a configurable policy engine (e.g., as configured by a user), which can include a decision tree, ruleset, and/or scoring matrix (e.g., as defined in YAML/JSON or embedded logic), thresholds for triggering specific agents (e.g., confidence>0.8→call root mapper), and/or conditional logic for dynamic routing (e.g., if off-peak and low impact→skip LLM). The policy evaluation engine can determine which agents of the model based AI agents 140 to invoke, the order to invoke the models and/or whether parallel execution is allowed.

For example, a policy can be if batch confidence score is greater than 0.85, a first set of agents (e.g., agents 210, 220 and 230 as described below in FIG. 2) are called in that order, otherwise, a second set of agents (e.g., agents 210 and 240 as described below in FIG. 2) are called. In another example, the policy can be: i) for an anomaly confidence greater than 0.85, and a user impact equal to "High", then a first set of agents can be called (e.g., agents 210, 220, 230 and 240 as described below in FIG. 2); ii) for an anomaly confidence greater than 0.85, then a second set of agents can be called (e.g., agents 210, 220 and 240 as described below in FIG. 2); iii) for an anomaly confidence less or equal to 0.85 and peak time is true, then a third set of agents can be called (e.g., agents 210 and 240 as described below in FIG. 2); and iv) for an anomaly confidence less or equal to 0.85, a fourth set of agents can be called (e.g., agents 210 and 230 as described below in FIG. 2).

The configuration can be input by a user (e.g., via a GUI), uploaded from memory, or any combination thereof.

The dynamic scheduling and execution can include for each selected agent, the orchestrator can insert the respective task in a job queue tagged with a priority. An asynchronous or multithreaded executor (e.g., thread pool, asyncio, or Kubernetes jobs) can be used to invoke the respective agents' exposed APIs and/or function handlers. Agents can be invoked with the batch data, context headers (e.g., agent call history), and/or control parameters (e.g., timeout, escalation flag) as inputs. The orchestration module 130 can log success or failure of each task and/or updates an internal execution graph per batch.

The intermediate evaluation and re-routing can involve after receiving output from each agent, the orchestration module 130 can perform: i) a type validation (e.g., does root mapper output a causal chain?); ii) score evaluation (e.g., risk score>0.7→escalate), iii) escalation handling (e.g., if causal link is missing, forward to LLM for augmentation), and/or iv) conditional re-entry into earlier stages (e.g., route to a backup agent or LLM based on feedback). The intermediate evaluation and re-routing can be implemented via a state machine, where each batch can move between states (e.g., "diagnosed", "unresolved", "escalated") tracked in a persistent store.

The action triggering and feedback loop can include taking one or more actions based on the final agent output. For example, if an anomaly decision agent (e.g., the anomaly decision agent 240 as described below in FIG. 2) signals actionable insight (e.g., "restart required"), the orchestration module 130 can call the remedial script executor 160 via API, update monitoring dashboards, and/or store audit logs in a designated database or log pipeline. If the LLM 150 provides parameter tuning suggestions, they can be pushed to a configuration handler or external controller for dynamic updates.

The orchestration module 130 can update its ruleset or confidence thresholds over time via feedback metrics (e.g., success/failure rate of interventions).

Figure 2:
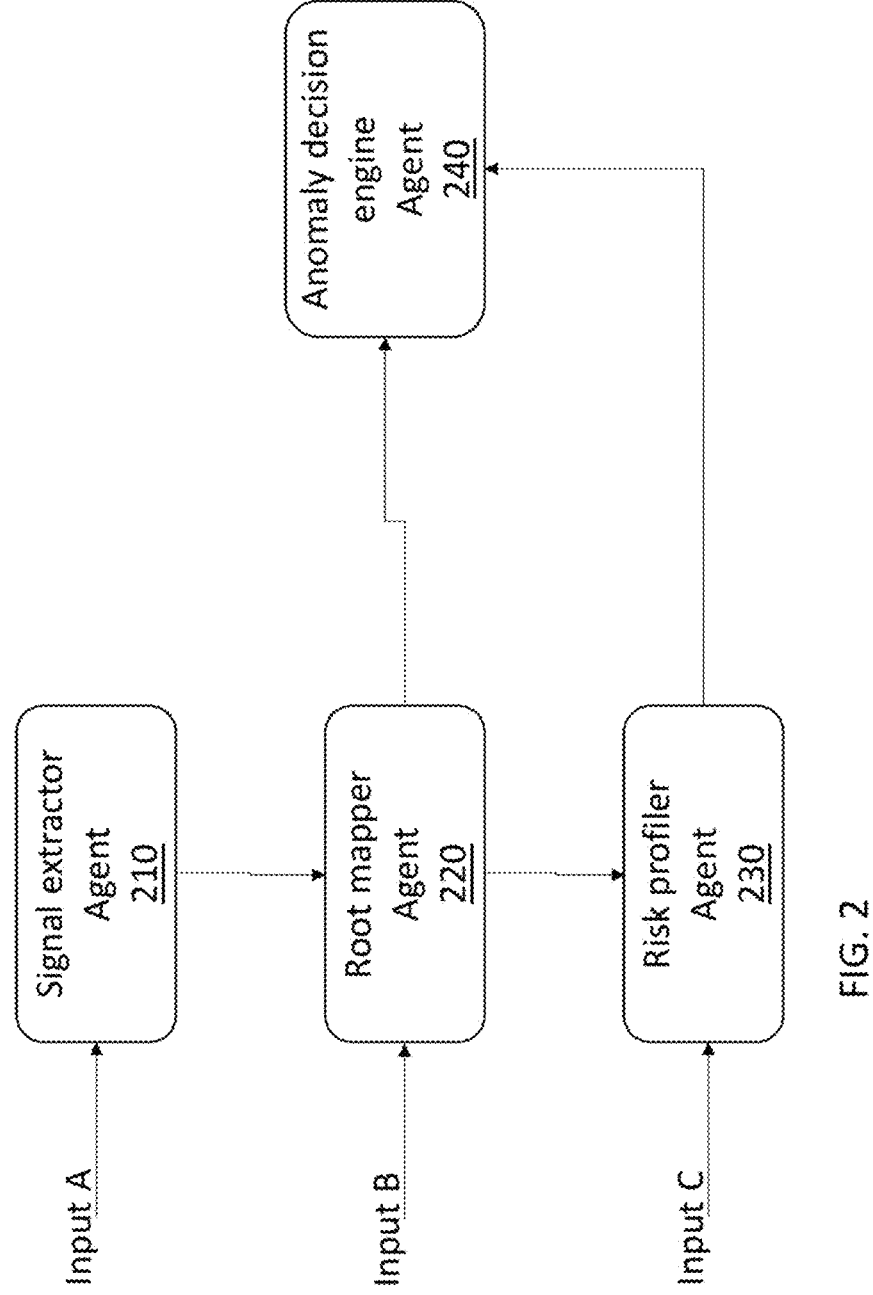
FIG. 2 shows a block diagram of the model based AI agent module of FIG. 1, according to some embodiments of the invention.

The model based AI agent module 140 can include a plurality of machine learning models. The plurality of machine learning models can determine whether an anomaly has occurred and/or predict whether an anomaly is about to occur. The plurality of machine learning models can include model-based reflex agents and/or reflex agents. Turning to FIG. 2, FIG. 2 shows a block diagram of the model based AI agent module 140 of FIG. 1, according to some embodiments of the invention.

The model based AI agent module 140 can include a signal extractor agent 210, a root matter agent 220, a risk profiler agent 230, and an anomaly decision engine agent 240. The signal extractor agent 210 can be a reflex agent. The root matter agent 220, the risk profiler agent 230, and the anomaly decision engine agent 240 can be model based agents.

The signal extractor agent 210 (e.g., a first machine learning module) can receive input A. Input A can include entropy filtered logs (e.g., the log data identified as having a higher entropy as described above), metrics and/or historical time series application data. The signal extractor agent 210 can detect statistically significant deviations from normal behavior in the received data. The statistically significant deviations can be a statistical test, or a threshold, a confidence level and/or a contextual domain rule (e.g., "high CPU usage for >10 minutes during off-peak"). The signal extractor agent 210 can be a transformer-based time-series anomaly detection model. The signal extractor agent 210 can be a supervised learning model (e.g., Random Forest, SVM, or neural networks). The signal extractor agent 210 can be a few-shot learning model (e.g., Siamese Networks or Prototypical Networks) to detect anomalies using limited labelled data and/or learned embeddings.

The signal extractor agent 210 can be trained with historical performance logs, known fault signatures (e.g., from prior detected anomalies), and/or synthetic anomalies (e.g., as input by a user) using supervised and/or few-shot learning techniques. The signal extractor agent 210 can be a supervised learning model (e.g., Random Forest, SVM, or neural networks). The signal extractor agent 210 can be a few-shot learning model (e.g., Siamese Networks or Prototypical Networks) to detect anomalies using limited labelled data and/or learned embeddings.

The signal extractor agent 210 can use temporal embeddings and transformer-based pattern analysis to identify emergent irregularities, which can indicate anomalies. The signal extractor agent 210 can output structured anomaly signals with pattern tags (e.g., "sustained response time increase," "memory usage surge"), a deviation confidence score (e.g., a score that indicates a confidence of the irregularity detection), and/or time-localized markers that indicate the time in the data that the irregularity pattern began. The output of the signal extractor agent 210 can be input to the root mapper agent 220.

The output structured anomaly signals can include one or more parts. The output structured anomaly signals can include: i) Pattern tags (e.g., string labels), for example, "sustained response time increase" or "memory usage surge."; ii) Deviation confidence score that can be numerical, e.g., a deviation confidence score of 0.92 can indicate a 92% confidence that there is an irregularity; iii) Time-localized markers via timestamps or ranges, e.g., start_time: 2025-05-31T14:23:00Z, end_time: 2025-05-31T14:28:00Z; and/or iv) Optional metadata (e.g., signal ID, severity score, an/or affected component).

The output structured anomaly signals can be a JSON structure (or other similar structure as is known in the art) as is shown below in Table 1.

TABLE 1

```
{
"pattern_tag": "memory usage surge",
"confidence_score": 0.92,
"start_time": "2025-05-31T14:23:00Z",
"end_time": "2025-05-31T14:28:00Z",
"affected_component": "Service_A",
"severity": "high"
}
```

The output structured anomaly signals format can allows downstream agents (e.g., the root mapper 220) to consume the outputs programmatically, analyze cause-effect chains, and/or visualize anomaly patterns in dashboards.

The root mapper agent 220 (e.g., second machine learning module) can receive the output from the signal extractor agent 210 and input B. Input B can include knowledge graphs that model system components, dependencies, network topology, and/or configuration relationships. The knowledge graphs can represent entities such as services, databases, message queues, API gateways, and/or their logical or physical connection. Input B can include historical incidents of anomalies and/or correlation rules. The root mapper agent 220 can use a combination of symbolic AI and neural graph reasoning to infer causal chains. For example, identifying that "high disk I/O on the database server" has a cause of "delayed response from Auth Service" which has a cause of "timeout in the UI Application."

The combination of symbolic AI and neural graph reasoning can include applying deterministic rules to the knowledge graphs to identify candidate casual links. The candidate casual links can be encoded as graph embeddings, which can be input into the neural graph reasoning. The neural graph reasoning can apply attention-based refinement. The output of the symbolic AI and the neural graph can be combined using a weighted fusion strategy, where the symbolic rules can provide hard constraints, and neural graph outputs can contribute to probabilistic adjustments. Conflicts between the symbolic AI and the neural graph can be resolved using a priority schema, where rule-derived edges can be preserved unless the neural graph predicts a significantly higher confidence alternative. The final causal chain can be output as an annotated graph structure, including causal links, source-target pairs, and combined confidence scores.

The combination of symbolic AI and neural graph reasoning can include an architecture with three modules: i) a symbolic reasoning module can operate over the knowledge graph built from system components, dependencies, and/or known correlation rules. The symbolic reasoning module can use symbolic logic (e.g., first-order rules and/or inference engines) to traverse relationships and/or apply deterministic reasoning for initial causal hypotheses; ii) a neural graph reasoning module can receive graph-structured data, which can include embeddings of entities and relationships, and can apply neural techniques (e.g., graph neural networks, attention-based models) to detect hidden patterns and/or refine or augment causal links beyond the initial casual determination; and iii) a fusion controller module can orchestrate the interaction between the symbolic reasoning module and neural graph reasoning module, managing data flow, conflict resolution, and/or output generation.

During operation, the structured anomaly signals can be received by the symbolic reasoning module from the signal extractor, including pattern tags, timestamps, confidence scores, and/or affected components. The symbolic reasoning module can map symbolic preprocessing onto the knowledge graph via symbolic rules that can be applied to infer direct causal links based on known dependencies to output an intermediate casual graph. For example, if Service A depends on database B, and database B shows a high disk I/O, it can be inferred that because Service A is upstream, Service A is a cause.

The symbolic reasoning module can generate graph embeddings to, for example, ensure computability with neural models. The neural graph reasoning module can apply attention mechanisms to the embedding to identify latent relationships, weigh indirect effects, and/or discover novel patterns not captured by symbolic rules.

The fusion controller can perform weighted fusion. The outputs of the symbolic reasoning module can be treated as hard constraints and/or high-priority links. The neural graph reasoning module outputs can provide soft, probabilistic adjustment. For each candidate causal link, a combined confidence score can be determined as shown below in EQN. 2

$$CombinedConfidence = \alpha * SymbolicConfidence + (1-\alpha) * NeuralConfidence \qquad \text{EQN. 2}$$

where $\alpha$ is a tunable parameter reflecting system trust in rule-based vs. learned patterns, and can be input by a user.

If the symbolic reasoning module and the neural graph reasoning module disagree, the fusion controller can prioritize symbolic reasoning if the symbolic confidence exceeds a threshold or allow neural overrides if the neural module predicts high-confidence novel relationships absent in the symbolic reasoning module.

The output of the fusion controller can be a structured causal chain that can be a directed graph with nodes (e.g., components/services) and edges (e.g., causal links). Each edge can be annotated with source and target entities, combined confidence score, a provenance tag (e.g., symbolic, neural, or hybrid), and/or time-localized markers indicating when the causal pattern was detected.

The output structured anomaly signals can be a JSON structure (or other similar structure as is known in the art) as is shown below in Table 2.

TABLE 2

```
{
"causal_chain": [
```

TABLE 2-continued

```
    {
        "source": "Database Server",
        "target": "Auth Service",
        "confidence": 0.92,
        "provenance": "symbolic"
    },
    {
        "source": "Auth Service",
        "target": "UI Application"
        "confidence": 0.85,
        "provenance": "neural"
    }
    ],
    "timestamp": "2025-05-31T14:28:00Z"
    }
```

The output of the root mapper agent 220 can be a structured root cause report that can include an origin component (e.g., initial source of the inferred causal chain), impacted downstream services, a confidence score for the inferred causal chain, and/or a classification of the anomaly type (e.g., network issue, application regression and/or configuration drift).

For a user-facing API that shows latency, and tracing (e.g., via the root mapper agent 220) reveals the initial source (e.g., root cause) is a database connection pool exhaustion, the database component can be labeled the origin component in the root cause report. The root mapper agent 220 can identify the origin component as the point from which downstream effects (e.g., like service delays or API timeouts) propagate.

The structured root cause report generated by the root mapper agent 220 can be a formalized, machine-readable (e.g., for automated pipelines) and/or human-readable (e.g., for operators and/or auditors) output that can consolidates the findings of the system's causal inference process (e.g., as described above via the symbolic reasoning module and the neural graph reasoning module).

The impacted downstream services can be other systems, e.g., microservices, or applications affected by the cascading effect of the origin issue. The confidence score can be a numerical value representing the system's (e.g., system as described above) confidence in the inferred causal chain, typically derived from weighted evidence aggregation. The anomaly classification can be a categorical label describing the anomaly type (e.g., network issue, configuration drift, application regression). The causal chain details can be a stepwise list or graph showing how the anomaly propagated from the origin component through the system.

The system can build the report by aggregating results from the signal extractor (e.g., raw anomalies), applying symbolic and neural reasoning (e.g., as described above) in the root mapper to infer causal relationships, generating a structured causal graph (nodes=components; edges=cause-effect), classifying the root anomaly type using trained classifiers, and packaging results into a structured output. The structured output can be as shown below in Table 3:

TABLE 3

```
    {
    "incident_id": "INC-2193",
    "origin_component": "Database Server",
    "impacted_services": ["Auth Service", "UI Application"],
    "confidence_score": 0.91,
    "anomaly_classification": "Configuration Drift",
    "causal_chain": [
        {
```

TABLE 3-continued

```
        "from": "Database Server",
        "to": "Auth Service",
        "reason": "High disk I/O causing delayed auth response"
    },
    {
        "from": "Auth Service",
        "to": "UI Application",
        "reason": "Delayed auth tokens causing frontend timeouts"
    }
    ],
    "timestamp": "2025-06-01T15:34:00Z"
    ]
```

In some embodiments, the output can be a textual summary.

A Root Cause Report can be output including an origin (e.g., database server having a high disk I/O) what is affected (e.g., authorization service delayed response), and/or impact (e.g., UI application having a time out). The root cause report can include a confidence score (e.g, between 0 and 100%) and/or a type (e.g., confidence drift).

The risk profiler agent 230 (e.g., third machine learning module) can receive the output from the root mapper agent 220 (e.g., the root cause report) and input C. Input C can include a historical system log (e.g., historical baseline data and/or incident data), environmental metadata (e.g., time of day, deployment history and/or user activity levels), user facing service logs (e.g., UI/UX data, and/or latency reports) and/or baseline behavior models. The risk profiler agent 230 can evaluate whether the likely anomaly as detected from the pattern deviation by the signal extractor agent 210 is relevant in the current operational context. For example, if a likely anomaly of exceeding load is predicted, the current operation context can be whether the system is under peak load. In another example, if a likely anomaly is service restart, e.g., as detected in logs, the current operation context can be whether the system is in maintenance mode. In another example, if a likely anomaly is a sudden drop in volume of transactions, then the current operation context can be whether the data is from a user-facing component. The risk profiler agent 230 can be an LLM that has input prompts of thresholds (e.g., thresholds as described above). For example, risk associated with "user time out" or "login failed" can be checked against the thresholds for acceptable failures (e.g., if the user timeout is occurring five times, this can be an acceptable, however, if it exceeds twenty times, it can be unacceptable).

The risk profiler agent 230 can output a severity score for the anomaly (e.g., Low, Medium, High), estimated user impact of the anomaly (e.g., "affects 40% of login requests"), and/or priority classification of the anomaly (e.g., urgent alert, deferred issue).

The anomaly decision engine agent 240 can receive the output from the signal extractor agent 210, the root mapper agent 220, the risk profiler agent 230 and/or additional inputs of an action map repository, organizational rules, user input thresholds, healing playbooks stored in a policy or knowledge base and/or service level agreement metadata. The action map repository can be structured data including predefined remediation actions, recover steps, and/or playbooks that can be triggered in response to certain anomalies.

The anomaly decision engine agent 240 can perform ensemble-style reasoning using weighted logic, cross-agent evidence reconciliation, and/or natural language synthesis. The anomaly decision engine agent 240 aggregates evidence to determine whether an anomaly is to causes an alert, trigger a self-healing script, generate a report and/or whether a complete audit trail is to be recorded in a database.

The weighted logic can be derived from: i) confidence scores attached to outputs from each contributing agent (e.g., the signal extractor having an example anomaly confidence of 0.92; and the root mapper having a confidence of 0.85 to a causal link), ii) predefined agent trust weights assigned at system design time (e.g., prioritizing root mapper signals over signal extractor signals in certain cases), and iii) dynamic adjustments based on contextual factors (e.g., giving more weight to agents with recent successful predictions).

A final decision weight can be determined as shown below in EQN. 3:

$$\text{FinalScore} = \Sigma(\text{AgentWeight}\_i \times \text{AgentConfidence}\_i) \qquad \text{EQN. 3}$$

In this manner the system can balance statistical confidence and domain-specific trust heuristics.

In some embodiments, a cross-agent evidence reconciliation can be determined by aligning agent outputs into a unified schema (e.g., normalizing the format of anomaly reports, causal chains, confidence metrics), mapping overlapping or conflicting findings (e.g., if two agents identify the same anomaly but assign different severities, the system uses reconciliation rules to prioritize or merge), and/or applying rule-based or learned fusion strategies (e.g., using decision rules or a meta-model to resolve conflicts and produce a coherent combined verdict).

The system can use template-based synthesis for predictable reports (e.g., "The database service experienced high disk I/O, causing latency in the UI."), neural summarization models (e.g., fine-tuned transformers) when complex multi-agent evidence needs to be turned into human-readable summaries, and/or context-aware phrasing where the synthesis module integrates severity, affected components, and timeline into readable narratives.

In this manner, not only are structured outputs provided but also clear, actionable natural language explanations can be provided.

For a self-healing script, the self-healing script can be from a stored database of scripts that correspond to the application and/or anomaly type. The self-healing script can cause restarting of the application and/or deleting the application cache.

Turning back to FIG. 1, the model based AI agents 140 can include an autoencoder model (not show) that includes an encoder and decoder for compressing the data output by the anomaly decision engine agent 240. The anomaly decision engine agent 240 can receive a log as input, for example, as shown below in Table 4:

TABLE 4

"INFO:2025-06-03 10:00:00 - User logged in successfully"
"ERROR:2025-06-03 10:00:05 - Database connection failed"
"WARN:2025-06-03 10:00:10 - Low memory detected"

The anomaly decision engine agent 240 can extract a level, time stamp and message from each log line and format the output as a JSON array of objects as shown for example in Table 5:

TABLE 5

```
{
    "level": "INFO",
    "timestamp": "2025-06-03 10:00:00",
```

TABLE 5-continued

```
    "message": "User logged in successfully"
},
{
    "level": "ERROR",
    "timestamp": "2025-06-03 10:00:05",
    "message": "Database connection failed"
},
{
    "level": "WARN",
    "timestamp": "2025-06-03 10:00:10",
    "message": "Low memory detected"
}
]
```

The encoder can compress the data into a lower-dimensional latent representation, the decoder can reconstruct the original input from the encoded representation. The autoencoder model can be trained on historical data without anomalies to learn to minimize reconstruction error for non-anomalous data.

The autoencoder can be a variational autoencoder (VAE). The VAE can maximize a lower bound on the data likelihood. The variational lower bound (VLB) can include reconstruction loss, which can indicate how well the decoder can reconstruct the input data from the latent variables, and KL divergence, which can regularize the VAE to ensure the learned latent distribution approximates a standard Gaussian distribution (e.g. N(0,1)). The VAE can have an objective function as shown below in EQN. 4:

$$\mathcal{L}(\theta,\phi;x) = \mathbb{E}_{q_\phi(z|x)}[\log p_\theta(x|z)] - KL[q_\phi(z|x)\|p(z)] \qquad \text{EQN. 4}$$

where $\mathbb{E}_{q_\phi(z|x)}[\log p_\theta(x|z)]$ is the reconstruction loss which can represent how closely the decoder can reconstruct the input data x from its latent representation z; and $KL[q_\phi(z|x)\|p(z)]$ is the KL divergence that regularizes the latent distribution to remain close to standard Guassian prior N(0,1) and serves as a key indicator in detecting anomalous behavior, $q_\phi(z|x)$, and the prior distribution $p(z)$.

The reconstruction loss, $\mathbb{E}_{q_\phi(z|x)}[\log p_\theta(x|z)]$, can be approximated using a mean square error. The means square error can be $MSE(x, \hat{x}) = (1/n)*\Sigma(x_i - \hat{x}_i)^2$. Table 6 shows steps with example values that can be used to determine the MSE:

TABLE 6

| Step | Normal Data Point (x = [55, 4.2]) | Anomalous Data Point (x = [99, 7.5]) |
|---|---|---|
| 1. Latent Variable Sample z | z≈0.6 | z≈2.3 |
| 2. Decoder Output x̂ | [54.9, 4.3] | [55, 4.3] |
| 3. Difference Vector (x − x̂) | [0.1, −0.1] | [44, 3.2] |
| 4. Squared Differences | [0.01, 0.01] | [1936, 10.24] |
| 5. Mean Squared Error | (0.01 + 0.01)/2 = 0.01 | (1936 + 10.24)/2 = 973.12 |

In the example shown in Table 6, a smaller MSE can indicate a better reconstruction, while a larger MSE can indicate a worse reconstruction.

The KL divergence $KL[q_\phi(z|x)\|p(z)]$ for a latent distribution can be determined by setting $q\_\phi(z|x) \sim N(\mu, \sigma^2)$ and prior $p(z) \sim N(0,1)$, such that the KL divergence can be determined as $KL = 0.5*(\mu^2 + \sigma^2 - \log(\sigma^2) - 1)$. Table 7 shows an example of determining the KL divergence for particular values:

TABLE 7

| Step | Normal Data Point ($\mu$ = 0.5, $\sigma^2$ = 0.2) | Anomalous Data Point ($\mu$ = 1.8, $\sigma^2$ = 1.2) |
|------|------|------|
| 1. $\mu^2$ | 0.25 | 3.24 |
| 2. $\sigma^2$ | 0.2 | 1.2 |
| 3. log($\sigma^2$) | log(0.2)≈−1.6094 | log(1.2))≈0.182 |
| 4. KL Formula | 0.5 * (0.25 + 0.2 − (−1.6094) − 1)≈0.53 | 0.5 * (3.24 + 1.2 − 0.182 − 1)≈1.1 |

In the example of Table 7, a smaller KL can indicate q(z|x) near prior, and a larger KL can indicate a significant deviation from prior.

The full VAE loss function as shown above in EQN. 4 can be determined by combining the reconstruction loss and KL divergence. Table 8 as shown below shows an example of determining the full VAE loss function for example values for a normal data point, x=[55,4.2] and an anomalous data point. X=[99, 7.5].

TABLE 8

| Step | Normal Data ($\mu$ = 0.5, $\sigma^2$ = 0.2) | Anomalous Data ($\mu$ = 1.8, $\sigma^2$ = 1.2) |
|------|------|------|
| 1. Sampled z using reparameterization | z = 0.5 + sqrt(0.2) * 0.2≈0.589 | z = 1.8 + sqrt(1.2) * 0.45≈2.293 |
| 2. Decoder output x̂ | [54.9, 4.3] | [55, 4.3] |
| 3. Reconstruction Loss (MSE) | ((0.1)^2 + (0.1)^2)/ 2 = 0.01 | ((44)^2 + (3.2)^2)/2 = 973.12 |
| 4. KL Divergence | 0.5*(0.25 + 0.2 − log (0.2) − 1)≈0.53 | 0.5*(3.24 + 1.2 − log(1.2) − 1)≈1.1 |
| 5. Total VAE Loss | −0.01 − 0.53 = −0.54 | −973.12 − 1.1 = −974.22 |
| 6. Interpretation | Good fit → normal behavior | Large deviation → anomaly |

For input data that is sequence data (e.g., time series) Recurrent Neural Networks (RNNs) or Long Short-Term Memory (LSTM) networks can be used within the autoencoder for better sequence-level anomaly detection. The decoder can reconstruct the original data from the encoded representation.

The reconstruction error for the decoder can be higher for anomalous data.

The model based AI agents 140 output can be input to the LLM 150. The LLM 150 can perform basic hyper parameter tuning by adjusting the model parameters like batch size, speed and/or number of epochs.

The LLM 150 can act as a meta-controller that can receive structured input (e.g., from the model based AI agents 140), can generate recommendations (e.g., hyperparameters, thresholds and/or retraining triggers), and/or can output tuning directives which can be applied to the model based AI agents 140 by the orchestration module 130. The LLM 150 can leverage transfer learning from its general training to provide domain-specific insights that can be used to reconfigure task-specific models via configuration updates or retraining triggers. For example: signal extractor agent 210 may receive an updated feature threshold, the root mapper agent 220 may switch to a different topology mapping rule.

The LLM 150 receive inputs in the form of summarized anomaly reports, entropy-filtered logs, event metrics, previously seen failures or diagnostic patterns, and/or prompts. For example, a prompt of "Given this sequence of anomalies and root causes, suggest a better threshold or tuning strategy for the root cause mapper" can be used. In some embodiments, prompts given to the LLM can be "Based on this anomaly log and severity profile, suggest hyperparameters for faster convergence"; "Here is a set of past anomaly cases-recommend threshold adjustments for the risk profiler"; and/or "Summarize the most relevant features causing model instability in root cause predictions."

The LLM 150 can generate outputs of suggested hyperparameters (e.g., learning rate, batch size, anomaly thresholds), model-specific configuration rules, feature prioritization (e.g., emphasize latency over CPU usage in anomaly detection), and/or decision-making heuristics (e.g., when to trigger retraining). The LLM 150 can be structured (e.g., JSON, YAML, or command templates) and/or ingested by a controller or automation layer, which then applies these suggestions to the relevant models.

Upon a determination that self-healing is to be done, the remedial scripts module 160 can include a plurality of remedial scripts. Each of the plurality of remedial scripts can be specific to the particular application and the specific anomaly detected. The plurality of remedial scripts can be input by a user.

FIG. 3 is flowchart for a method for anomaly prediction in a plurality of applications of a system to maintain operability of the system, according to some embodiments of the invention.

The method can involve receiving real-time data from the plurality of applications (Step 310). The real-time data can be as described above in FIG. 1. The plurality of applications can be a plurality of applications for a particular system.

For example, assume a system that deployed a new version of an "auth-service" application. The log data can be as shown below in Table 9.

[08:44:01] INFO-Deployment started: version 2.3.4-commit f7a3d9e

[08:45:12] WARNING—Connection pool exhausted. Active=50, Max=50

[08:45:15] ERROR—TimeoutError: Failed to acquire DB connection in 5000 ms

[08:45:20] ERROR—Unclosed connection detected at handler.py: 42

[08:45:30] INFO—Health check passed

Table 9

The method can involve for each desired variable in the data, determining entropy based on the respective data wherein the entropy can indicate an anomaly in the respective data (Step 315). The desired variables can be variables that can indicate for the plurality of applications whether an anomaly occurs. The desired variables can be default variables (e.g., variables that are likely available for any application, e.g., cpu speed, memory consumption, network traffic, disk I/O, respond time, throughput and/or error rates.

Continuing with the above example, the entropy determination can determine that "connection pool exhausted" and "unclosed connection" have high entropy.

The method can involve dividing the data for each of the plurality of applications into batches of a fixed size (Step 320). The fixed size can be based on processing resource availability. Batching the data can allow for better allocation of processing resources, e.g., CPU and memory. Batching the data can allow for scalability, by for example, allowing handling of larger datasets without overloading processing capabilities. Batching the data can allow for real-time analysis.

The method can involve applying a plurality of machine learning models to each of the batches to determine whether the data contains an anomaly or is about to contain an anomaly, wherein the plurality of machine learning models includes a model-based reflex agent and a learning agent that is trained based on historical data from the plurality of applications (Step 325). The plurality of machine learning models can be the machine learning models as described above with respect to FIG. 2. In various embodiments, one or more of the agents of FIG. 2 are not used, and/or the agents of FIG. 2 are used in different orders.

For example, in high-throughput anomaly detection, only the signal extractor and anomaly decision agent may be used, bypassing causal mapping and risk profiling to accelerate real-time alerting. In another example, when externally reported anomalies are ingested, the system may directly invoke the root mapper and risk profiler agents without re-running internal anomaly extraction. In another example, in remediation-focused workflows, the system can execute automated scripts solely based on pre-classified incident types using the anomaly decision agent, omitting upstream analysis entirely. The use of only less than one of the agents or agents in different order can be achieved through a configurable control layer (e.g., configuration as described above in FIG. 1 with respect to the orchestration module 130), that can route inputs and intermediate results across agents allowing, for example, the system to flexibly adjust to task-specific needs, conserve computational resources, and/ or optimize for speed, depth, or automation depending on the operational scenario. In this manner, the invention can go beyond a fixed linear sequence of models by, for example, providing selective and context-aware recombination.

Continuing with the example above, the plurality of machine learning models can determine a similarity between the current and historical "connection pool exhausted" and "unclosed connection", as shown below in Table 10:

TABLE 10

| Matched Pattern | Similarity Score | Incident ID |
|---|---|---|
| "Connection pool exhausted" | 0.89 | INC-2193 |
| "Unclosed connection" | 0.85 | INC-1407 |

The similarity can be determined based on a cosine similarity, Euclidian distance and/or learned similarity models (e.g., neural network trained to score similarity between complex patterns). For example: Similarity (current, historical)=cosine (embedding_current, embedding_historical), which can produce a similarity score between 0 (no similarity) and 1 (identical). Thus, the system outputs as shown in Table 10 can indicate a match between historical incident ID (e.g., INC-2193), and pattern label (e.g., "connection pool exhausted").

The similarity score can guide downstream decisions, such as recommending actions based on past resolutions, prioritizing alerts, or linking incidents for root cause analysis.

The method can involve applying a large language model (LLM) to the output of the plurality of machine learning models to evaluate performance of and fine tune the plurality of machine learning models (Step 330). For example, as described above with respect to LLM 150 in FIG. 1.

Continuing with the above example, the LLM can output a summary as shown below in Table 11:

TABLE 11

```
{
  "timestamp": "2025-04-13T08:45:00Z",
  "affected_service": "auth-service",
  "anomaly_type": "database_connection_leak",
```

18

TABLE 11-continued

```
  "confidence": 0.91,
  "summary": "Spike in /login latency after new deployment. Logs show
DB pool saturation and unclosed connections. Similar to prior incident
INC-1407.",
  "root_cause": "Unclosed DB connections in login handler (handler.py:
42) causing pool exhaustion. ",
  "recommended_action": "Rollback deployment or fix connection
handling in handler.py.",
  "impact": {
    "endpoint": "/login",
    "latency_ms": 2800
  },
  "matched_incidents": ["INC-2193", "INC-1407"]
}
```

The method can involve transmitting an alert to a system that automatically executes one or more scripts to take action to avoid the anomaly (Step 335). For example, the scripts as described above with respect to FIG. 1.

Continuing with the above example, the alert can be as shown below in Table 12:

Root Cause: Database connection leak (unclosed connections in handler.py)

Recommendation: Rollback or patch DB handler.

Confidence: 91%

Related Incidents: INC-2193, INC-1407

Table 12

Figure 4:
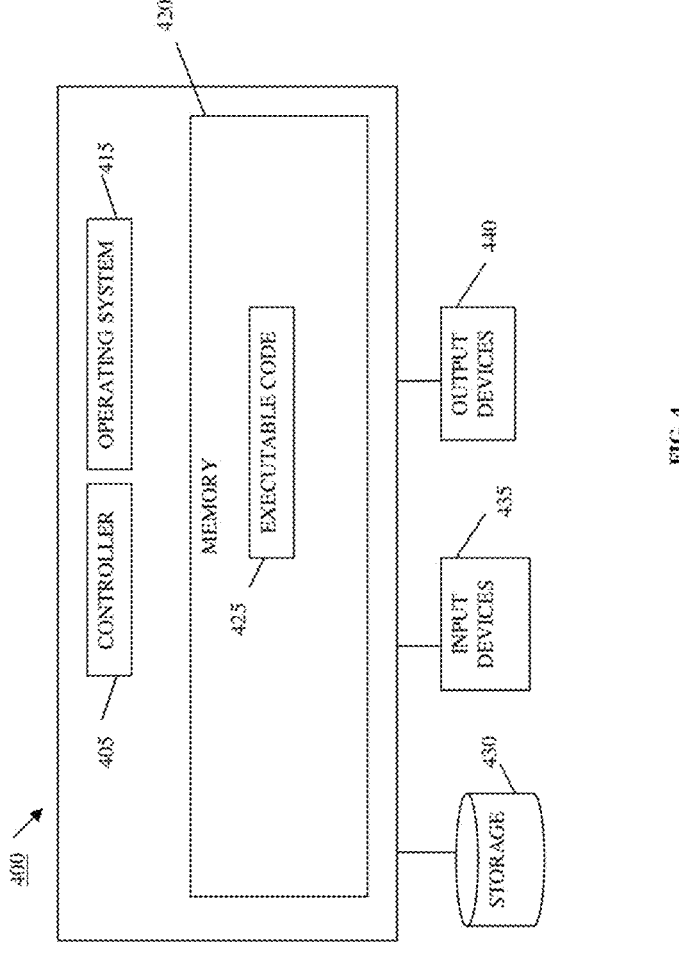
FIG. 4 shows a block diagram of an exemplary computing device which may be used with embodiments of the present invention.

FIG. 4 shows a high-level block diagram of an exemplary computing device which may be used with embodiments of the present invention. Computing device 400 may include a controller or processor 405 that may be, for example, a central processing unit processor (CPU), a chip or any suitable computing or computational device, an operating system 415, a memory 420, a storage 430, input devices 435 and output devices 440 such as a computer display or monitor displaying for example a computer desktop system. Each of the modules and equipment and other devices and modules discussed herein, e.g. as shown in FIG. 1 described below and modules and processes in FIG. 1, 2 or 3 may be or include, or may be executed by, a computing device such as included in FIG. 4 although various units among these modules may be combined into one computing device.

Operating system 415 may be or may include any code segment designed and/or configured to perform tasks involving coordination, scheduling, arbitration, supervising, controlling or otherwise managing operation of computing device 400, for example, scheduling execution of programs. Memory 420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 may be or may include a plurality of possibly different memory units. Memory 420 may store for example, instructions (e.g. code 425) to carry out a method as disclosed herein, and/or data.

Executable code 425 may be any executable code, e.g., an application, a program, a process, task or script. Executable code 425 may be executed by controller 405 possibly under control of operating system 415. For example, executable code 425 may be one or more applications performing methods as disclosed herein, for example those of FIG. 3 or other figures, or other methods, according to embodiments of the present invention. In some embodiments, more than one computing device 400 or components of device 400 may be used for multiple functions described herein. For the various modules and functions described herein, one or more computing devices 400 or components of computing device 400 may be used. Devices that include components similar or different to those included in computing device 400 may be used, and may be connected to a network and used as a system. One or more processor(s) 405 may be configured to carry out embodiments of the present invention by, for example, executing software or code. Storage 430 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data may be stored in a storage 430 and may be loaded from storage 430 into a memory 420 where it may be processed by controller 405. In some embodiments, some of the components shown in FIG. 4 may be omitted.

Input devices 435 may be or may include a mouse, a keyboard, a touch screen or pad or any suitable input device. It will be recognized that any suitable number of input devices may be operatively connected to computing device 400 as shown by block 435. Output devices 440 may include one or more displays, speakers and/or any other suitable output devices. It will be recognized that any suitable number of output devices may be operatively connected to computing device 400 as shown by block 440. Any applicable input/output (I/O) devices may be connected to computing device 400, for example, a wired or wireless network interface card (NIC), a modem, printer or facsimile machine, a universal serial bus (USB) device or external hard drive may be included in input devices 435 and/or output devices 440.

Embodiments of the invention may include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

The aforementioned flowcharts and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system or an apparatus. Accordingly, aspects of the present invention may take the form of an entirely hardware embodiment or an embodiment combining software and hardware aspects that may all generally be referred to herein as a "circuit," "module" or "system."

The aforementioned figures illustrate the architecture, functionality, and operation of possible implementations of systems and apparatus according to various embodiments of the present invention. Where referred to in the above description, an embodiment is an example or implementation of the invention. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with materials equivalent or similar to those described herein.

While the invention has been described with respect to a limited number of embodiments, these should not be construed as limitations on the scope of the invention, but rather as exemplifications of some of the preferred embodiments. Other or equivalent variations, modifications, and applications are also within the scope of the invention. Accordingly, the scope of the invention should not be limited by what has thus far been described, but by the appended claims and their legal equivalents.

The invention claimed is:

1. A method for anomaly prediction in a plurality of applications of a system to maintain operability of the system, the method comprising: receiving real-time data from the plurality of applications, wherein the plurality of applications is at least twenty; for each desired variable in the data, determining entropy based on the respective data wherein the entropy can indicate an anomaly in the respective data; dividing the data for each of the plurality of applications into batches of a fixed size; applying a plurality of machine learning models to each of the batches to determine whether the data contains an anomaly or is about to contain an anomaly, wherein the plurality of machine learning models includes a model-based reflex agent and a learning agent that is trained based on historical data from the plurality of applications; applying a large language model (LLM) to an output of the plurality of machine learning models to evaluate performance of and fine tune the plurality of machine learning models; and transmitting an alert to a system that automatically executes one or more scripts to take action to avoid the anomaly.

2. The method of claim 1 wherein the data is logs, metrics, network traffic, or any combination thereof.

3. The method of claim 1 wherein the LLM is fine tuned based on the entropy.

4. The method of claim 1 wherein determining entropy further comprises determining a frequency distribution for each of the desired variables.

5. The method of claim 1 wherein the plurality of machine learning models are further trained with the real-time data when an anomaly is predicted in the real-time data.

6. The method of claim 1 wherein each entropy value can be based on a probability.

7. The method of claim 1 wherein the plurality of machine learning models includes a signal extractor agent, a root mapper agent to correlate rules, a risk profiler agent, or any combination thereof.

8. The method of claim 1 wherein the data further comprises time series behavior of a CPU, memory latency reports, historical baseline performance, traffic, error rate or any combination thereof.

9. The method of claim 1 wherein the anomaly prediction is done in parallel for the plurality of applications.

10. The method of claim 1 wherein the plurality of applications is a thousand or more.

11. A system for anomaly prediction in a plurality of applications of a system to maintain operability of the system, the system comprising: a memory; and a processor configured to: receive real-time data from the plurality of applications, wherein the plurality of applications is at least twenty; for each desired variable in the data, determine entropy based on the respective data wherein the entropy can indicate an anomaly in the respective data; divide the data for each of the plurality of applications into batches of a fixed size; apply a plurality of machine learning models to each of the batches to determine whether the data contains an anomaly or is about to contain an anomaly, wherein the plurality of machine learning models includes a model-based reflex agent and a learning agent that is trained based on historical data from the plurality of applications; apply a large language model (LLM) to an output of the plurality of machine learning models to evaluate performance of and fine tune the plurality of machine learning models; and transmit an alert to a system that automatically executes one or more scripts to take action to avoid the anomaly.

12. The system of claim 11 wherein the data is logs, metrics, network traffic, or any combination thereof.

13. The system of claim 11 wherein the LLM is fine tuned based on the entropy.

14. The system of claim 11 wherein determining entropy further comprises determining a frequency distribution for each of the desired variables.

15. The system of claim 11 wherein the plurality of machine learning models are further trained with the real-time data when an anomaly is predicted in the real-time data.

16. The system of claim 11 wherein each entropy value can be based on a probability.

17. The system of claim 11 wherein the plurality of machine learning models includes a signal extractor agent, a root mapper agent to correlate rules, a risk profiler agent, or any combination thereof.

18. The system of claim 11 wherein the data further comprises time series behavior of a CPU, memory latency reports, historical baseline performance, traffic, error rate or any combination thereof.

19. The system of claim 11 wherein the anomaly prediction is done in parallel for the plurality of applications.

20. The system of claim 11 wherein the plurality of applications is a thousand or more.

* * * * *